United States Patent
Klank

(10) Patent No.: US 6,690,658 B1
(45) Date of Patent: Feb. 10, 2004

(54) INDOOR COMMUNICATION SYSTEM AND SYNCHRONIZATION FOR A RECEIVER

(75) Inventor: Otto Klank, Lehrte-Arpke (DE)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/508,368

(22) PCT Filed: Aug. 31, 1998

(86) PCT No.: PCT/EP98/05526

§ 371 (c)(1),
(2), (4) Date: Mar. 10, 2000

(87) PCT Pub. No.: WO99/14872

PCT Pub. Date: Mar. 25, 1999

(30) Foreign Application Priority Data

Sep. 13, 1997 (EP) .......... 97115977

(51) Int. Cl.[7] .......... H04B 7/212
(52) U.S. Cl. .......... 370/324; 370/337; 370/347
(58) Field of Search .......... 370/310, 310.1, 370/310.2, 321–324, 328–330, 336–7, 345, 347, 458, 498, 516

(56) References Cited

U.S. PATENT DOCUMENTS

| | | |
|---|---|---|
| 5,177,740 A | 1/1993 | Toy et al. |
| 5,559,807 A | 9/1996 | Van den Heuvel et al. |
| 5,666,366 A | 9/1997 | Malek et al. |
| 5,802,046 A * | 9/1998 | Scott .......... 370/280 |
| 5,959,980 A * | 9/1999 | Scott .......... 370/280 |
| 6,049,538 A * | 4/2000 | Scott .......... 370/347 |
| 6,094,421 A * | 7/2000 | Scott .......... 370/280 |
| 6,388,997 B1 * | 5/2002 | Scott .......... 370/280 |

FOREIGN PATENT DOCUMENTS

| | | | |
|---|---|---|---|
| DE | 0 534 399 A2 | 9/1991 | .......... H04B/7/01 |
| WO | 96/09701 | 3/1996 | |

OTHER PUBLICATIONS

Raynchaudhuri, et al. "WATMnet: A Prototype Wireless ATM System for Multimedia Personal Communication".
International Search Report.

* cited by examiner

*Primary Examiner*—David Vincent
(74) *Attorney, Agent, or Firm*—Joseph S. Tripoli; Paul P. Kiel

(57) ABSTRACT

In a multi-user system for wireless transmission of video, audio and/or combined signals or general communication signals a proposal is given for the timing and synchronization of the various messages of the users. The proposal is based on a combined FDMA/TDMA transmission and access technique. Data from the users are transmitted in a common frame comprising a number of control slots and also a number of data slots, each slot being associated with a guard time. The slot signals have the characteristics that i) the time position of the first control slot signal in the frame is based on the last control slot signal of the previous frame, ii) the time position of the subsequently transmitted control slot signals is based on the position of the previous control slot signal, iii) the time position of the data slot signals is based on or is referred to the last control slot signal in the same frame, which can be a signal of another user or of its own, iv) at the end of the frame, behind the last slot signal an additional or increased guard time significantly longer than the general guard times associated with the other slots is placed.

Figure 1:
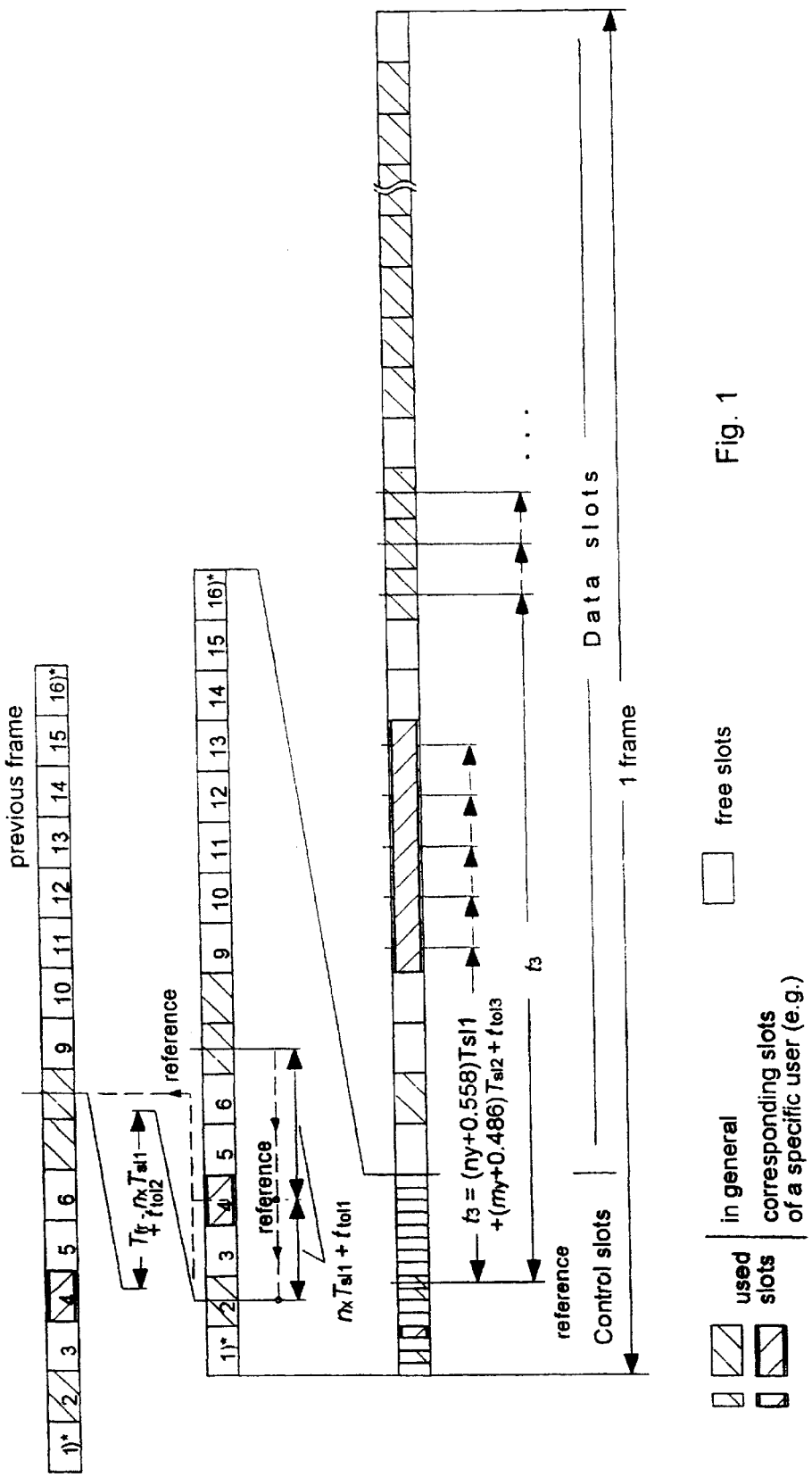

The proposal also includes a communication system and a receiver for a communication system.

6 Claims, 5 Drawing Sheets

INDOOR COMMUNICATION SYSTEM AND SYNCHRONIZATION FOR A RECEIVER

For private homes and also local area networks (LAN) developments are going on to connect all kinds of devices as TV, PC, stereo system, alarm system, telefone, etc. together. Known are already home systems which communicate by using the 230 V power line.

The object of the invention is to provide a time reference system and a synchronisation method for a receiver of above indoor communication system.

All devices of a home have to work in a quasi-synchronous mode with a frequency stability for example of about 10×10−6. The inventive transmitted signals of any device are frame-aligned to the signals of the others. The timing of the following frame is based—according to the invention—directly on the last preceding control slot signal. The transmitted control slot signals are related to the respective preceding control slot, the first control slot of the frame is related to the last control slot of the previous frame. The timing of the data slot signals of all devices will be based on the last control slot signal of the same frame, applying the defined frame structure. At the end of the frame a longer guard-time can be included.

A receiver—according to the invention—for the frequency synchronisation of a device is described. To synchronize on different signals within a frame which are incorrect in their relative timing and differ in their RF frequency more or less, an ad-hoc process is necessary. From the correlation of the midamble a first correlation signal is derived. With this first correlation signal a channel-equalization-process is started which yields a channel corrected output signal. From this channel corrected output signal the signal identically to the input signal can be reconstructed by using the channel pulse response.

1. System Synchronization Requirements relevant only for the signals within a cluster, and in some respect also for the identification of signals from other clusters.

1.1 Introduction

The various signals of the users or terminals of one cluster are embedded in a common TDMA frame. If the use of a second channel is allowed, this embedding applies separately to both channels, whilst the messages and data transmission of a user may be split over the two channels. The inventive frame organization is based on time slots which are assigned to the users during initialization processes and which requires at least a quasi-time-synchronous generation and transmission of the slot signals. Furthermore, certain timing tolerances have to be kept in order to avoid collisions within the own frame and to ensure transmission of the defined data rates. In addition, the evaluation of the various signals in the receiver should be as simple as possible where especially the maximal centre frequency deviation could be an important factor, e.g. for the correlation with midambles and channel equalization process.

The principles are described and tolerance proposals are given in the chapters 1.2. and 1.3. Especially the tolerances may be subject to further considerations.

Transmission—especially the correct positioning of the transmitted slot signals—requires an adequate receiver in order to monitor and time-evaluate the signals of the other users and accordingly arrange the own signals. The corresponding part is described in the chapters 2. 'Receiver synchronization' and 3. 'Channel acquisition, monitoring and sensing processes'.

Since the various signals of the frame are not fully synchronous—neither in the RF frequency nor in the timing—, the receiver has to deal with changing conditions and a quasi-ad-hoc. synchronization or evaluation must be performed if signals of more than one user shall be monitored or evaluated.

1.2 RF (frequency) accuracy

Depending on the requirements, the reference oscillator(s) can be a remarkable cost factor. On the other hand, a very complex processing in the receiver—in order to deal with rather bad conditions—might also cause realization problems. Finally, a compromise has to be made.

A requirement from the receiver point of view could be to allow a fast monitoring with practicable means, i.e. with only one correlation per slot or midamble, which implies that the phase rotation within the midamble caused by the frequency deviation is significantly less than 180°, otherwise additional correlations with pre-distorted midambles have to be performed or the result in critical cases will be significantly less than the maximum.

Taking into account the relatively high frequencies of the ISM bands with 2.4 and 5.7 GHz and furthermore the fact that the receiver has to work with corresponding deviations of the transmitted signal and of its own oscillators, this leads to a tolerance of $\pm 10 \ast 10^{-6}$. The corresponding frequency and phase deviations are shown in Table 1.1.

TABLE 1.1

(RF) Frequency and phase deviations based on a relative tolerance of $\pm 10 \ast 10^{-6}$

|  | 2.4 GHz | | 5.7 GHz | |
| --- | --- | --- | --- | --- |
|  | Transmitter | Receiver (after downconversion) | Transmitter | Receiver (after downconversion) |
| Frequency deviation | ±24 kHz | ±48 kHz | ±48 kHz | ±96 kHz |
| Phase deviation )* per symbol | ≈±1.05° | ≈±2.1° | ≈±2.1° | ≈±4.2° |
| Phase deviation per midamble |  | about 34° |  | about 70° |
| Phase deviation over half the data slot duration |  | about 880° or ≈2.5 π |  | about 1750° or ≈4.9 π |

*A frequency deviation of e.g. ± 24 kHz corresponds to a relative 'phase speed' of 24000 'signal rotations' (of 2π) per second equal ±24000/s * $T_s$ * 360° ≈± 1.05° per symbol The deviations over a few symbols are already too big to be ignored in the receiver. Dedicated maximum search and pulse response evaluation methods and also special 10 signal corrections methods or equivalent measures are needed in order to achieve sufficient results in the correlation and demodulation processes. On the other hand, a crystal oscillator with an accuracy and long-term stability of ±10 ppm is already a sophisticated device for consumer applications and it seems not to be adequate to place more severe constraints on this part of the system.

1.3 Frame synchronization and timing of slots and symbols

The transmitted signal(s) of any user must be frame-aligned to the signals of the others (if present), which implies:

Positioning and numbering of the own control slot signal in accordance with the positioning and numbering of the control slot signals of the other users (preferably the one being ahead in the series of signals)

In addition—to concatenate all cluster signals and avoid the formation of subclusters —, the timing of any control slot signal shall directly be based on the preceding control slot signal, transmitted by another user or, if no other user exists, by the own transmitter in the previous frame; normally a signal within the same frame but in case of the first one this has to be the last control slot signal from the preceding frame.

The timing of the data slot signals of all users will be based on the last control slot signal having relevant amplitude, applying the defined frame structure.

It has to be noted that, under certain conditions—acquisition phase—control signals may not be transmitted in all frames; the principles are described in the System Description. This requires a flexible operation of the device with respect to the slot signal to be used as reference.

Further details of preferred embodiments of the invention are described with reference to the Figures.

FIG. 1: Frame alignment and timing tolerances of signals within a frame (example), FIG. 2: concatenation of the various signals and tolerances.

Figure 3:
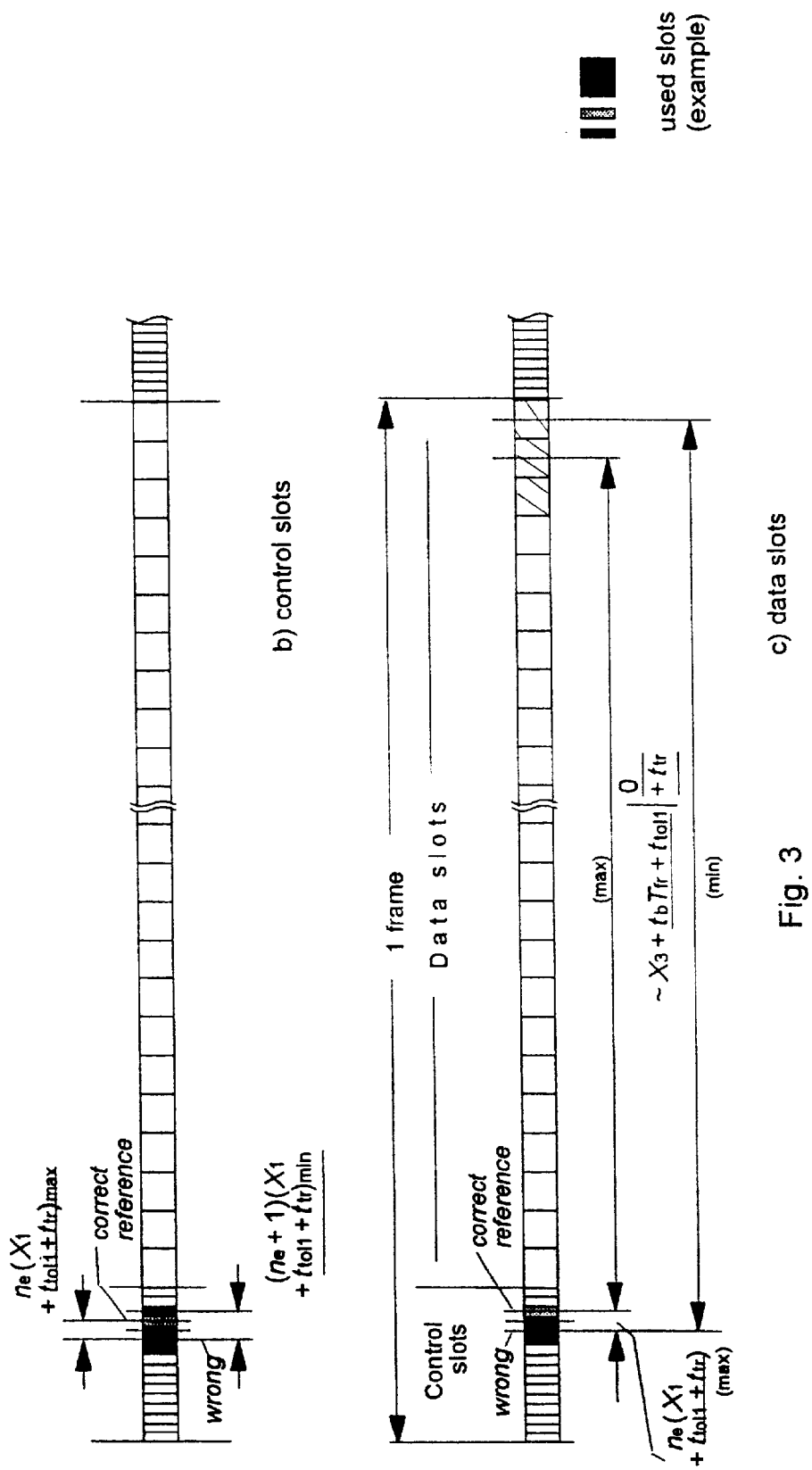

FIG. 3: Concatenation of signals and tolerances (b and c); choosing wrong reference signals FIG. 4: an example for a correlation result (only magnitudes), comprising the components of three users (different magnitudes and delay constellations).

Figure 4:
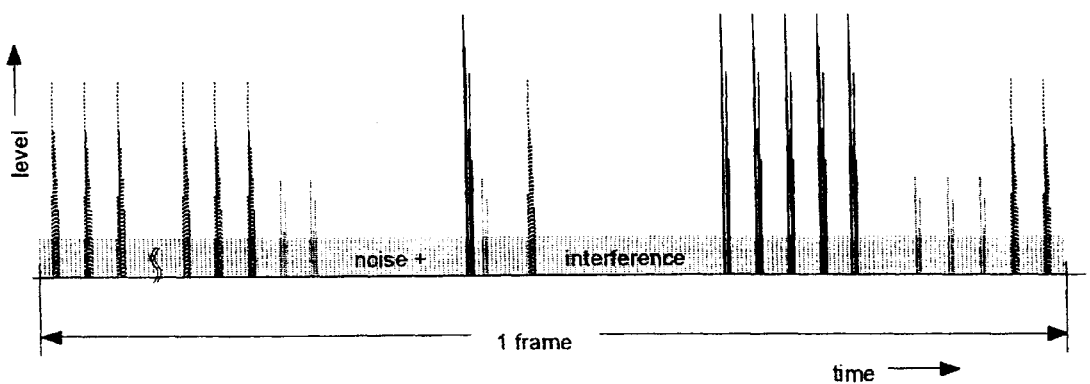
Figure 5:
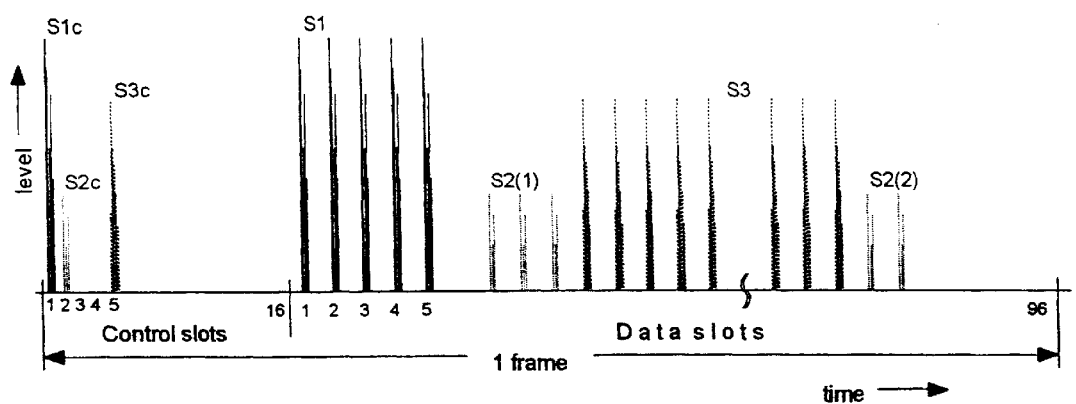

FIG. 5: Correlation result showing the signals of FIG. 4 after assignment to a detected commonly used frame (spacing over time partly different; noise and interference suppressed)

Figure 6:
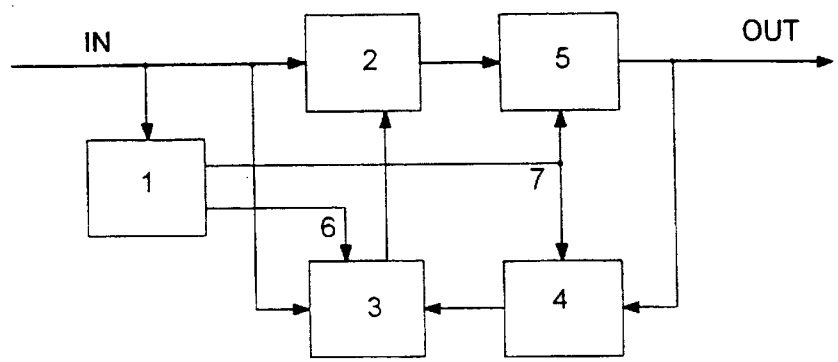

FIG. 6: Functional diagram of channel estimation, equalization and frequency (phase) correction FIG. 7: Correlation result containing control and data signals of three transmitters (spacing over time partly different; the threshold defines whether a slot is determined to be empty or not)

Frame alignment and tolerances are shown in FIG. 1, where:

$T_{sl1}$ (=25.8 $\mu$s) and $T_{sl2}$ (=103.2 $\mu$s) are the theoretical control and data slot durations incl. guard time and $T_{fr}$ (=10.32 ms) is the theoretical frame duration; $n_x$ and $n_y$ are the numbers of entire controls slot spacings between the slot taken into account and the reference slot (relevant only within the control signal section); $m_y$ is the number of entire data slot spacings between the slot taken into account and the reference slot (relevant only within the data signal section); and $t_{tol1}$, $t_{tol2}$ and $t_{tol3}$ are the allowed tolerances defined below.

The components 0.558 $T_{sl1}$ and 0.486 $T_{sl2}$ take into account the duration of half a control slot and half a data slot—the first with full and the second without guard time—at the end of the control slot section. These values correspond with the centre definition used below; they have to be adapted if another definition shall be used.

The following tolerances have to be applied in order to avoid bigger timing deviations over the length of a frame and severe drawbacks in the data handling:

TABLE 1.2

| Control slot centre)*; with respect to the centre of the last received control-slot signal (from another user)*; depending on the envisaged position, either $t_{tol1}$ (within the same frame) or $t_{tol2}$ (frame-overlapping) | either $t_{tol1} = -1.0...-0.5$ $\mu$s or $t_{tol2} = -1.25...-0.25$ $\mu$s |
|---|---|

TABLE 1.2-continued

| Data slots centres)* with respect to the centre of the last control-slot signal in the frame (derived from any other user or being a signal of its own) | $t_{tol3} = -1.0...-0.5$ $\mu$s $\pm 25 * 10^{-6} * [(n_y + 0.5)T_{s11} + (m_y + 0.5) T_{s12}]$ |
|---|---|

*1) The centres of the transmitted slot signals and the reference control slot signal(s) are here defined by the centres of the midamble sections, position between the 10th and 11th symbol, where in case of a received reference signal the first component of the pulse response, with relevant amplitude, shall be used. The correlation time and other delays caused in the receiver have to be removed.
*2) The positioning is free if no other user exists, but in this case the tolerance $t_{tol2}$ has to be kept to the own signal in the previous frame.

Table 1.2: Timing tolerances to be applied to control and data slots. The terms used in the table are identical to those used in FIG. 1.

A negative tolerance $t_{tol1}$ $t_{tol2}$ or $t_{tol3}$ means that part of the guard time of the preceding slot signal might already be used by the following signal. The reason is to ensure that the practical frame cannot be longer than the defined 10.32 ms, to guarantee the specified data rates.

The processes are to be based on the transmitted midambles correlation, and, in order to find the frame start, on finding the control slots signal(s). Several possibilities exist; the framing can be detected by one or a combination of the following methods:

First, the relative positioning and the sizes of the various slot signals can be evaluated—different size and spacing of the control slots and the general data slots; the method, in some cases, might not give a defined result.

Secondly, a correlation with the sequence used for the cluster identification number, or a selected section out of it, might be performed, which is a rather complex method but presumably yields a definite result Finally, the content of all received slot signals (or only of those which have been identified of being in the control slot section) will be analyzed with adequate methods in order to detect the control slot location numbers etc.

Further details are described in chapter 2. 'Receiver synchronization'.

The solution requires an ad-hoc positioning of the control slot signal and also—commonly for all data slots of a user—of the data slot signals. The tolerance of about 0.5 $\mu$s ($\approx$4 symbols) enables the user to apply its own free-running clock signal with $\pm 25*10^{-6}$ and allows reasonable timing deviations in the reference slot signal evaluation and in the signal timing for transmission. The data slots are related to the last control slot in the frame and use the same clock together with the calculated and corrected distances.

Other timing solutions are possible, e.g. to base any slot signal on the preceding one or to base all slot signals commonly on one e.g. the first control slot signal.

Several requirements have to be fulfilled in order to avoid collision between the successive frames or data sections within the frame and to ensure that the defined data rate can be achieved. The following calculations confirm that this will be achieved. The maximum time deviation, positive as negative, per frame can be estimated by the following equation:

$$t_{\Delta fr} \approx (1 \ldots 16) \ (t_{tol1} + t_{tr}) + t_b T_{fr}$$

where the part $16 * t_{tol1}$ represents the 16 (possible) tolerances in the control slot signal positioning (incl. one to the previous frame) and $16 * t_{tr}$ takes into account the sum of transfer times (incl. an uncertainty of $\pm \frac{1}{2}$ symbol) over the connections needed to derive the reference position. $t_b$ $T_{fr} = \pm 25 \cdot 10^{-6} \cdot T_{fr}$ takes into account the basic (relative) tolerance of the reference system measured over one frame (some of the distances to which this has been applied are shorter to some extent; this is negligible).

The corresponding internal distance $t_{\Delta,int}$ is defined by the following equation:

$$t_{\Delta,int} \approx t_b \, T_{fr} + t_{tol1} \begin{vmatrix} 0(condit. \ 2) \\ +t_{tr}(condit. \ 1) \end{vmatrix}$$

The application of the transfer time $t_{tr}$ depends on the question whether the reference signal is derived from another user (condit. 1) or the own control signal (condit. 2, if the signal is the last one in the frame).

The concatenation of both ranges with minimum and maximum values yields the time deviation $t_x$ (see below).

Figure 2:
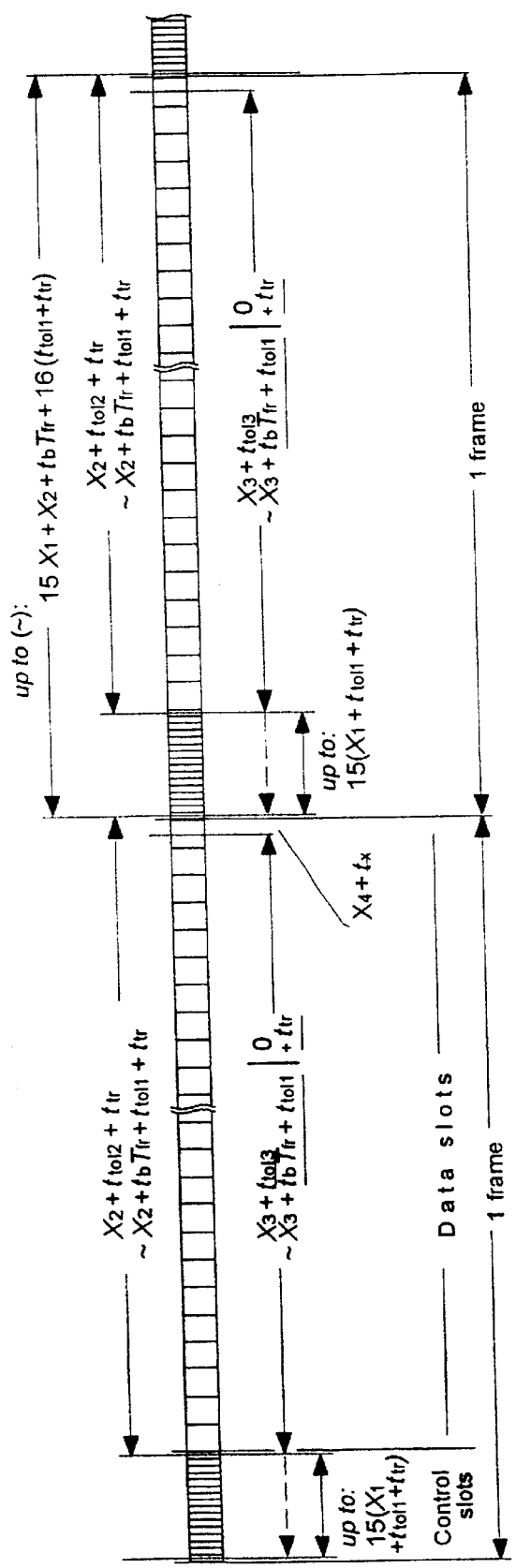

FIG. 2 shows the concatenation of the various signals and tolerances,
where
$X_1 \ldots X_4$ are the theoretical distances (see FIG. 1), $t_b$ is the basic (relative) tolerance of $\pm 25 \cdot 10^{-6}$, and $t_x$ represents a resulting deviation between the overall and the internal framing.

The requirements are:

In order to achieve the defined data rate: $(t_\Delta)_{max} < 0$;

In order to avoid collisions between successive frames:

$$t_{x(max)} \approx -[t_b T_{fr} + t_{tol1} + t_{tr}]_{min} + [t_b T_{fr} + t_{tol1} + t_{tr}]_{max} < 0.7 \, T_g;$$

with $T_g \approx 3 \, \mu s$: guard time.

Another critical issue could be that a user chooses the wrong control slot signal(s) as references for the positioning of its own control and/or data slot signals—maybe due to unsatisfactory receiving conditions for to the correct signal. In this case constellations according to FIG. 3 are given and the resulting deviations $t_y$ can be calculated by building the differences of minimum and maximum values according to the following formulae;

for the control slots $$t_{y,c(max)} \approx -[(n_e+1)(t_{tol1}+t_{tr})]_{min} + [n_e(t_{tol1}+t_{tr})]_{max} < 0.7 T_g;$$

and for the data slots $$t_{y,d(max)} \approx -[t_b T_{fr} + t_{tol1} + t_{tr} + n_e(t_{tol1}+t_{tr})]_{min} + [t_b T_{fr} + t_{tol1} + t_{tr}]_{max} < 0.7 T_g;$$

$$= -[t_b T_{fr} + (n_e+1)(t_{tol1}+t_{tr})]_{min} + [t_b T_{fr} + t_{tol1} + t_{tr}]_{max} < 0.7 \, T_g$$

where $n_e$ represents the number of error steps with respect to the correct reference position (e.g., with $n_e=2$, the correct and the next possible reference signals have been left out, are not usable). The reference value is again 70% of the guard time. For the control signals this is a more hypothetical case because only if the correct signal is detected but not used (due to bad conditions), a corresponding position can be chosen (if the signal is not detected the user, might choose the same position which then causes a collision).

FIG. 3 shows the concatenation of signals and tolerances (b and c); choosing wrong reference signals.

In all cases corresponding minimum values can be calculated by changing the min/max conditions, and average values are derived by averaging the max- and min-results. With the defined tolerances and assuming a transfer time range of $t_{tr} \approx 0.01 \ldots 0.1 \, \mu s \pm 0.06 \, \mu s = 0.05 \ldots 0.16 \, \mu s$ (equival. to 2 ... 20 m and incl. $\pm \frac{1}{2}$ symbol uncertainty), the results presented in Table 1.4 are achieved:

TABLE 1.3

Minimum, maximum and average time deviations within the frame

|  |  | Range | | Average | |
|---|---|---|---|---|---|
|  |  | absolute | relative | absolute | relative |
| $t_{\Delta fr}$ | max: | $-0.1 \, \mu s$ | $-10 \cdot 10^{-6}$ | $-8.5 \, \mu s$ | $-0.83 \cdot 10^{-3}$ |
|  | min: | $-17 \, \mu s$ | $-1.65 \cdot 10^{-3}$ |  |  |
| $t_x$ | max: | $1.2 \, \mu s$ | 40% of $T_g$ | 0 |  |
|  | (min:) |  |  |  |  |
| $t_{y,c}$; | max: | $1.75 \, \mu s$ | $\approx 58\%$ of $T_g$ | $0.7 \, \mu s$ | 23% of $T_g$ |
| $n_e = 1$ | (min:) | (<0) |  |  |  |
| $n_e = 2$ | max: | $2.5 \, \mu s$ | $\approx 83\%$ of $T_g$ | $0.7 \, \mu s$ | 23% of $T_g$ |
|  | (min:) | (<0) |  |  |  |
| $t_{y,d}$; | max: | $2.25 \, \mu s$ | $\approx 75\%$ of $T_g$ | $1.2 \, \mu s$ | 40% of $T_g$ |
| $n_e = 1$ | (min:) | ($\approx 0$) |  |  |  |

Due to the averaging over a number of different effects and the deviations of up to 16 users the deviation ranges will presumably be smaller. In any case, a certain average deviation in the order of $-8 \, \mu s$ per frame will remain, which means that the frame is practically shorter than the defined value of 10.32 ms and the possible data rates are higher by about 0.08%. Consequently, some of the occupied data sections, e.g. a few symbols per slot from time to time, cannot be filled and a data management is needed in order to adapt the rates. Some kind of adaptation would be needed in any case because of the missing synchronism between the transmission media and the data sources itself.

with respect to choosing the wrong reference signals, practically two steps are allowed for the control slots (83% with $n_e=2$) but only one step can be accepted for the positioning of the data slots (75% with $n_e=1$).

Thus, the defined tolerance concept provides reasonable tolerances for the system components and allows the requirements with respect to system performance to be fulfilled in order to guarantee specified data rates and/or avoiding collisions.

A preferred improvement of this solution is described by the following: If the guard times of all slots were decreased by about 5% and the resulting time of about 15 $\mu s$ was added to the end of the frame, this allows to increase the tolerances significantly. The values themselves are shifted more to the centre. This measure reduces the deviation of the possible average data rates. A possible 'scenario' is shown below.

Second Proposal:

TABLE 1.4 from Chapter 1 (modified version):Timing tolerances to be applied to control and data slots-modified values based on a small decrease of all guard times ($\approx 5\%$) and an additional/longer guard time at the end of the frame.

| | |
|---|---|
| Control slot centre)*; with respect to the centre of the last received control-slot signal (from another user)*; depending on the envisaged position, either $t_{tol1}$ (within the same frame) or $t_{tol2}$ (frame-overlapping) | either $t_{tol1} = -0.5\ldots0.4 \, \mu s$ or $t_{tol2} = -0.75\ldots0.65 \, \mu s$ |
| Data slots centres)* with respect to the centre of the last control-slot signal in the frame (derived from any other user or being a signal of its own) | $t_{tol3} = -0.5\ldots0.4 \, \mu s$ $\pm 25 \cdot 10^{-6} \cdot [(n_{y+} 0.5)T_{s11+} (m_y + 0.5) T_{s12}]$ |

*further details see Table 1.2

Results achieved with

TABLE 1.5

Minimum, maximum and average time deviations within the frame (modified version-see above)

|  |  | Range | | Average | |
|---|---|---|---|---|---|
|  |  | absolute | relative | absolute | relative |
| $t_{\Delta fr}$ | max: | 9 µs (<15) | +0.87 * 10$^{-3}$ | 0 | 1 |
|  | min: | −9 µs | −0.87 * 10$^{-3}$ |  |  |
| $t_x$ | max: | 1.6 µs | 57% of $T_g$ | 0 |  |
|  | (min:) | (−1.6 µs) |  |  |  |
| $t_{y,c}$; | max: | 1.65 µs | ≈60% of $T_g$ | 0 |  |
| $n_e = 1$ | (min:) | (−1.65 µs) |  |  |  |
| $n_e = 2$ | max: | 2.75 µs | ≈98% of $T_g$ | 0 |  |
|  | (min:) | (−2.75 µs) |  |  |  |
| $t_{y,d}$; | max: | 2.15 µs | ≈77% of $T_g$ | 1.6 µs | 57% of $T_g$ |
| $n_e = 1$ | (min:) | (1.05 µs) |  |  |  |

Therefore, with this embodiment the guard time of the control slots is decreased to 2.75 µs, the guard time of the data slots to 2.85 µs, and to add the time gain of 16.48 µs to the end of the frame, which yields 19.33 µs for the last value.

2. Receiver Synchronization

2.1 Introduction see also chapter 1 'System synchronization requirements'

Frequency conversion and coherent signal demodulation and evaluation in the receiver require adequate mixing and clock signals. In principle—if a continual reception of only one signal or one other device is taken into account—the reference oscillators for frequency conversion and clock could be synchronized on the received signals, or alternatively, a correction of the received and down-converted signal and/or a correction of a free-running timing oscillator signal could be, made. Such processes could be based on evaluating the midambles and determined sections of the received slot signals.

However, to be able to fast synchronize on different signals within a frame, which are incorrect in their relative timing and differ in the (RF) frequency, the synchronization has to be preferably an ad-hoc process than a continuous synchronization. This means, the timing for each received slot will be based on the position of the midamble and the frequency deviation ('phase speed') of the received signals will be estimated also for each slot and corrected together with the channel estimation and correction process.

Furthermore, the receiver has to assign the received symbols, slots etc. to the corresponding frame sections (control slots and determined data slots of which the numbers are given by each transmitters). This is done be analyzing the relative positioning of the midambles, and by finding and analyzing the control slots. Special algorithms to be applied are described below together with some alternative methods—in order to show that a system based on the proposed tolerances is feasible.

2.2 Timing includes symbol timing, detection of the frame structure and some aspects of estimating the channel pulse response.

2.2.1 General approach

Timing of the received symbols and the assignment to the commonly used frame are to be based on correlation processes, i.e., corresponding sections of the received signal will be correlated with the reference or training sequence (midamble) stored in the receiver. For a general searching or monitoring function—in order to detect all components within the frame or cluster—this must be done on a symbol-by-symbol basis over at least one frame according to the following equation:

$$C_x = \sum_{m=0}^{15} v_{x+m} Y_m; \; 0 \leq x \leq N_{fr}$$

where x defines the position within a data sequence with $N_{fr}$=: number of symbols per frame, $v_{x+..}$ are the received data values, $Y_m$ represents the training sequence, and $C_x$ delivers the amplitudes and phases of the received slot signals.

FIG. 4 shows an example for a correlation result (only magnitudes), comprising the components of three users (different magnitudes and delay constellations).

In order to assign the received component signals to the commonly used frame in order to detect the frame start, one or a combination of the following methods can be applied:

The correlation results can be filtered over time in order to reduce the number of calculations: For example, up to 210 succeeding values will be removed and positions excluded as long as these values are at least 3 dB less than the actual value; if a bigger value appears, the last selected value and position disappear if the value is at least 3 dB below the actual value and the distance to the actual position is less than 210 steps; the counting process in this case is being restarted.

The relative positioning and the magnitudes of the various slot signals derived by correlation are evaluated and matched with the defined frame structure (different size and spacing of the control and the general data slots or multiples of them, different magnitudes from the various users etc.); however, this method, in some cases, might not give a clear result.

A section of successive data symbols, in accordance with the relative positioning of the cluster identification number sequence, or a fraction out of it, is selected together with each of the relevant correlation peaks, and a correlation is performed between the chosen section and the corresponding reference sequence stored in the receiver; an adequate result—with respect to the midamble result—indicates a control slot signal.

Finally, the content of all received slot signals (or only of those which have been identified of being in the control slot section) will be analyzed with adequate methods in order to detect the control slot location numbers etc.

It has to be noted that very small components in the correlation result may come from other, e.g. far-distant, networks using the same channel. These have to be or can be excluded from further evaluations by a more sophisticated processing—taking into account that they may lie outside the expected ranges of the midambles, vary in their relative position to the own frame—no continuous reception—and are not indicated via the frame control signals/'first slots' of the own cluster.

Other sporadic pulses or responses including echo components, caused by a (sub-optimal) imitation of the midamble by the general data stream, may appear within data sections.

These pulses are also characterized by a—from frame to frame—varying position and additionally by the fact that there is always a bigger main pulse within the same section.

FIG. 5 shows a correlation result where the components (same as in FIG. 4) have been assigned to the detected used frame.

After a first analysis of the structure, i.e. after knowing the frame start and the slot positioning—the x scale being shifted adequately—the correlation processes may be restricted to those ranges where the midambles are to be expected. To include 20 concatenated timing deviations of the various signal sources—within a cluster—and such caused by the different path lengths and echoes (see Table 1.4 in chapter 1.4→System Description), the range could be chosen to ±9 µs or ±r=±75 symbols with respect to the previous frame in:

$$C_{l,sel} = \sum_{m=0}^{15} v_{x_s+l+m} Y_m; -r \le l \le r$$

$x_s$ are the selected centre positions (note: $x_s$ differs by 8 from the corresponding position x in the first equation). The position of the maximum magnitude value $|C_{l,sel}|_{max} = W_{l_{max},s}$ within the range is called $l_{max,s}$.

The reliability of the result with respect to echo amplitudes and phases might be improved to a certain extent by performing a cyclic, e. g. modulo 16, correlation afterwards, based on the maximum found in the previous process. The selection of the relevant data section of one slot has to be based on $l_{max,s}$. The succeeding signal processing is to be performed with the same local clock conditions in conjunction with the channel pulse response of the slot.

The remaining, absolute deviation of the own clock from a (possible) optimal position causes a deviation of the channel parameters is included in the correlation result $C_{x,sel}$ and will automatically be corrected in the corresponding channel correction process.

A remaining relative timing error between the two devices—based on $25*10^{-6}$ for each and calculated over the relevant range of one slot—results in a timing error for the outer sections of the slots in the order of $$\pm 2 \cdot 25 \cdot 10^{-6} \cdot 836/2 \approx \pm 0.021 \text{ symbols}.$$

This may cause amplitude errors of less than 1.5% (si function) and can be neglected.

2.2.2 Options, channel pulse response

The processes defined so far may—under certain conditions—not give a very clear maximum due to the following reasons:
frequency deviations of the received and down-concerted signal, causing reasonable phase deviations within the midamble,
sampling with bigger time deviations (>¼ of a symbol) with respect to an optimal timing, causing a long tail of side pulses (si function).

Nevertheless, the results should be good enough for a rough timing, especially at (RF) frequencies of 2.4 GHz. On the other hand, an upgraded process might be needed anyhow to estimate a rough frequency deviation for a starting process (see chapter 2.3, Centre frequency deviations and correction process) and the same method could as well be applied or the same results be used for the timing and channel pulse response estimation.

To overcome the disadvantage of an unfavourable symbol timing, a second correlation could be performed with a time shift of half the sampling interval, which requires an additional sampling with the inverted clock signal over at least the midamble plus some extension. Finally, the best constellation could be chosen to be valid for the entire slot (criteria: peak value or remaining power outside a certain time range to be as low as possible).

However, the effects reached with any of this measures are not too big, but without both, the correlation results could be degraded by more than 6 dB (compared with the optimum values) and a significant part of this can be gained back by applying them.

2.3 Centre frequency deviations and correction process 2.3.1 Rough estimation and start procedure Centre frequency deviations and the corresponding phase rotation values (per symbol as well per data slot) have been investigated within the chapter 1.2→System Description); the relevant values for reception are:

Phase deviation per symbol | at 2.4 GHz: ≈ ±2.1°
 | at 5.7 GHz: ≈ ±4.2°

This deviations over half a slot—the relevant distance between the midamble. centre (correlation result) and the data symbols at the edge positions—are at 2.4 GHz:≈(±)870° at 5.7 GHz:≈(±)1750°

However, the deviation is a time-linear rotation of the complete signal which can be corrected by an opposite rotation of the received values, at least for the time of one slot. The main question is: can this be made in combination with a 'closed': equalizer, or is a combined equalization and correction process needed, and if yes, what complexity does this require?

In the following sections a correction method is described which uses the equalizer output results or intermediate values to calculate phase/frequency correction values for the received signal at the input of the equalizer.

A simplified functional diagram of the process is shown in FIG. 6.

A baseband signal IN is fed to the input of a phase correction device 2, to the midamble correlation device 1 and a Δφ calculation and averaging device 3. The output signal of the phase correction device 2 is led to an input of a (viterbi) equalizer 5. The output of the equalizer 5 is fed back via a signal reconstruction device 4 to Δφ calculation and averaging device 3. One correlation signal output 7 of the midamble correlation device 1 is fed to control inputs of the equalizer 5 and the signal reconstruction device 4. A second output of the midambles correlation device 1 is fed to a control input of the φΔ, averaging device 3 as start condition signal line 6.

A starting position or value for the correction of a number of symbols around the midamble, including the midamble itself, might be found by one or a combination of the following procedures:
Rough estimation; method 1: A series of optional correlations around the midamble is performed, either with the midambles or the received data streams being (phase)-pre-distorted in accordance with certain (expected) frequency deviations, the maximum is determined and its position delivers a value for the 'phase speed'.
Rough estimation; method 2: The correlation process with the midamble(s) is split into two halves; the phase deviations between the main components of both sections are calculated and averaged; the result is valid for the distance of 8 symbols in case of a single training sequence of length 16 or for 16 symbols in case of two training sequences of length 16.
Improved frequency deviation estimation; method 3: Alternatively or optional, the sequence used in the control slot(s) for cluster identification or a selected part of this sequence is used together with the channel pulse response and results of either method 1 or method 2—for modulo2π control—in order to calculate a more accurate phase deviation value; the process may be split into several calculations using subgroups of, e.g., 8 symbols of the whole partition taken from the cluster identification sequence; the result, or the subgroup results are valid for the corresponding distance(s) between the section taken into account and the training or midamble section centre.

Although this method is correct only for the control slot(s), the results, in case of limited Doppler influence, might also be taken as a basis for the other slot signals from the same user, in the same frame.

Detailed Description, Method 1

The calculations during the correlation process have to be extended by a constant phase shift of $e^{j\Phi_d}$ per symbol, resulting in a sequence of shifts of $e^{j\Phi_i}=i \cdot e^{j\Phi_d}$, where d defines the steepness of the additional function, positive and negative values, and i gives the position within the data stream (e.g. positive and negative values with respect to the centre of the midamble):

$$C_{l,sel} = \sum_{m=0}^{15} v_{x_s+l+m} Y_m e^{j\varphi_1}; -r \leq l \leq r \quad \left| \begin{array}{l} \text{this normally implies a conjugate-complex} \\ \text{multiplication of } v_x \text{ and } Y_m, \text{ but as } Y_m \text{ is only a} \\ \text{real-value sequence, it turns to a normal} \\ \text{multiplication} \end{array} \right.$$

The correlation range is defined by r, where similar conditions have to be chosen as in chapter 2.2 Timing, e.g., ±75 symbols. The results from the timing correlation might as well be used and multiplied by $e^{j\Phi_i}$.

The process has to be performed for an adequate number of devalues, frequency deviations. For example, at 2.4 GHz the deviation over the midamble is 34°, and if this range shall be searched in steps of 10°, equivalent to resulting phase deviations of 5° abs. or ±2.5° with respect to the centre, this would require 2-times 3 correlations, positive and negative values. Of course, this quantity can be reduced by a more sophisticated process.

The maximum correlation result defines the deviation per symbol $\gamma = \phi_d$ (with $d_{opt}$). Under reasonable noise conditions, the result might be improved by performing an interpolation over, e.g., the three values around/inclusive the maximum in order to determine the real position of the maximum.

Method 2

Two different correlations are to be made with the training sequence split into two halves, in case of a single sequence or with the two parts of a double sequence, e.g. 2×16 symbols, the results of the two correlations are A+jB and C+jD. The relative phase difference (per symbol) between both is:

$$\varphi_{\Delta,rel} = \gamma = \frac{1}{q_x}\left(\arctan\frac{AD-BC}{AC+BD}\right)$$

where $q_x$ is given by the quantity of symbol spacings between the centres of both sequences or parts. The phase difference between both sub-results should not extend 180°.

Method 3

The following steps are performed:

The sequence used for cluster identification—known by the receiver—is being modified according to the channel pulse response—convolution process, in order to construct a sequence identically to the corresponding input signal section but without frequency deviation and the corresponding phase deviations;

the phase deviation between the modified cluster identification sequence and the corresponding sequence of the received signal is calculated symbol by symbol, division or conjugate-complex multiplication and averaged—the whole is identical to a correlation process—, taking into account the possibility of included modulo2π steps; finally the deviation per symbol is calculated.

In order to estimate whether modulo2π steps are implied or not, the result of the rough frequency deviation estimation—method 1 or 2—can be used to calculate a rough, relevant value for the investigated section; it defines the amount of integer modulo2π steps being included.

The averaging process normally has to be split into several sub-processes with, e.g., subgroups of 8 symbols, in order to avoid estimation errors caused by phase deviations within the sequence taken into account.

The intermediate results from the subgroups are valid for the corresponding distances between the section taken into account and the centre of the training or midamble section. These results are then divided by the corresponding distance in order to obtain a deviation per symbol. Finally, the various results are averaged.

All methods suffer, more or less and although averaging processes are implied, from noise (better conditions are achieved with method 3). However, the results in practical cases should be good enough to start a process as described below.

2.3.2 Frequency correction process

In a first step, the received data values, starting with the first (known) symbol below and above the centre of the midamble and proceeding in both directions symbol by symbol, will be corrected with $-(i-\frac{1}{2})\gamma$ for the upper part and with $-(-i+\frac{1}{2})\gamma$ for the lower part (multiplications by $e^{-j(\pm i \mp \frac{1}{2})\gamma}$; where i is the index of the symbols starting with 1 for both sides from the midamble's centre and γ is the result of the frequency deviation estimation from above—preferable of the improved estimation).

After this, the equalization process can be started, favourably also with the respective known symbols of the midamble. This yields, with a delay depending on the length of the equalizer or of an adequate part, a number of channel-corrected output values for both sides from the centre of the midamble.

The equalizer only knows the law how the channel is build but nothing about phase deviations as well noise values etc. However, the output values found by decision include a correction of the remaining small phase or frequency-deviations and of noise if the deviations are not to big Thus, if the output sequence and the channel law to reconstruct the input signal is used, these values will not contain the remaining phase deviations, and a division of both signals, the received data values $v_i$ and the reconstructed values $y_i$, and the calculation of corresponding phase angles should yield the remaining phase deviations $\Delta_i$:

$$v_i = \frac{v_i}{y_i} = \frac{v_i}{\sum_{p=0}^{P} b_{i-p} h_P} = E + jF$$

$$\Delta_i = \arctan\frac{F}{E}$$

$b_{i-p}$ are the equalizer output values and $h_p$ represents the channel pulse response (identically to $C_{I,sel}$). In all cases corresponding values have to be used. For example, the last equalizer output value of a sequence used to reconstruct the input value $v_i$ has also to be marked with i. This implies that the reconstructed signal is delayed by a time equivalent to the depth of the equalizer.

Assuming this yields reasonable results, then the values can be used to update $\gamma$ by $\pm\Delta_i/i$, values from both directions and applying a simple filtering. The new $\gamma$ is then used to pre-correct the next data values as above before entering the equalizer, and so on This applies for the whole slot. Another possibility is to maintain the $\gamma$ value from the rough or improved estimation as $\gamma_o$ and to only add an additional component representing the additional correction according to $\Delta_i$, where a simple filter function can be applied:

$$\gamma = \gamma_o + \gamma \text{ with } \gamma_{corr} = (1-\beta)\gamma_{corr-1} + \beta\Delta_i$$

where $\gamma_{corr-1}$ represents the previous correction value and $\gamma_{corr}$ the actual value. β defines the filter characteristic; a value of, e.g., 0.05 might be used for a case in which the β values represent groups or results of 8 symbols averaged.

Due to the equalizer delay, there is a kind of extrapolation automatically included, which may reduce the speed of corrections and prevent the application of high Doppler frequencies, e.g. in mobile reception.

Decision errors of the equalizer and noise in general will probably have some influence on the correction process, especially at the beginning, but with average error rates up to $3*10^{-4}$, there should not be a remarkable (additional) degradation. In any case, this another similar strategy has to be confirmed by simulations of the complete system.

2.3.3 Further options

The frequency deviation estimates made for the various slots from one or several users might be averaged over a longer time period and part of the resulting deviation, e.g. if it exceeds a value of 1.5-times the allowed tolerance for one user might be used to correct the own reference oscillator.

Channel Acquisition, Monitoring and 'Sensing' Processes 3.1 General monitoring during stand-by It is recommended—mandatory from the network point of view—that devices which are not in use—stand-by function—monitor at least the signals of the own cluster or network —if present—in order to detect a message determined for itself, or, if a network does not exist, watch at least all other channels to detect a new set-up of a network of the own cluster and subsequently a message.

This implies in case of the network frame detection and the evaluation of control slots at least with respect to an announcement of new messages. In this case the positioning of the midambles is roughly known, which simplifies the evaluation and reduces the required processing significantly compared with a situation where a network is not present and all possible channels need to be checked.

A current monitoring of the own network—midambles—enables the device to fast acquire a corresponding part of the channel if requested.

If a network of the own cluster does not exists or only one exists but a second one is allowed, then all possible channels have to be checked and identified with respect to the presence of signals, that implies correlation with midamble, frame determination, cluster identification number and, if a network of the own cluster appears, the checks described above have to be applied.

Channels used by other clusters might be excluded for a while but need to be checked from time to time in order to detect a release by the "old" user and an entering by a user of the own cluster.

The monitoring normally includes searching the channels on midambles, which yields a knowledge about empty channels and enables the device to be as fast as possible if requested to open a network.

The processes are identically to those described in chapter 2.2—Timing 12.2.1 —General approach. Either a continuous correlation symbol by symbol or, in case of a network of the own cluster, a detailed analysis is performed, where in these cases only the magnitudes are relevant. A simultaneous processing with different (phase-pre-distorted) sequences seems not to be necessary. The corresponding formulae are:

—for a general monitoring process, applied to unknown channels:

$$|C_x| = \left|\sum_{m=0}^{15} v_{x+m} Y_m\right|; 0 \leq x \leq N_{fr} \text{ or continuously}$$

for monitoring a channel used by the own cluster or one with known framing, used by another cluster:

$$|C_{I,sel}| = \left|\sum_{m=0}^{15} v_{x_s+l+m} Y_m\right|; -r \leq l \leq r$$

where:

$v_{x+..}$ are the received data values, $Y_m$ represents the training sequence, $C_x$ and $C_{I,sel}$ are the correlation results, x (in the first equation) defines the position where at least the length of one frame ($N_{fr}$) has to be investigated, $x_s$ (in the second equation) are the selected centre positions (note: $x_s$ differs by 8 from the corresponding position x in the first equation), and r defines the correlation range.

Figure 7:
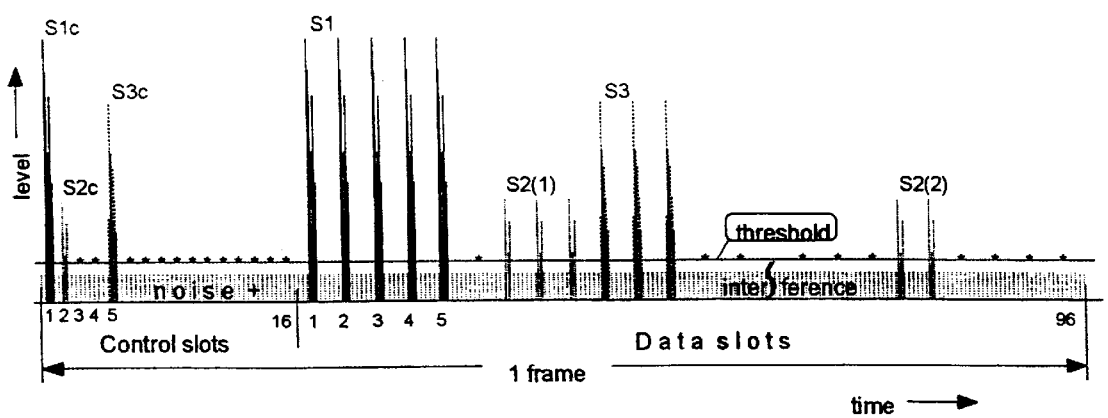

FIG. 7 shows an example of a correlation result obtained from a channel used by three transmitters, which might be a channel of the own cluster or from another, near-by cluster, depending on the identity number as described below, whereby "*" marks empty slots, relevant only if the channel belongs to the own cluster.

It has to be noted that some rather small components in the correlation result—among those belonging to an identified cluster or network—may come from other far-distant networks using the same channel. These might be distinguished by a more sophisticated processing—taking into account that they may lie outside the expected ranges of the midambles and vary in their relative position to the known frame, no continuous reception. However, for the monitoring and sensing processes, these effects are of minor importance.

It should further be noted that, the correlation methods applied here for the detection and evaluation of system-conform signals are unsuitable to detect other signals such as interference from amateur radio or microwave ovens. Therefore, it is recommended to estimate as well the received power in relevant channels.

In order to check the cluster identity, the corresponding section(s) of the control slot signal(s) has (have) to be demodulated, decoded and compared with the own cluster identity number. Alternatively, a correlation with a sequence in accordance with the identity number can be made. Depending on the results and the midamble correlation result, this yields different statements:

Identity check positive, midambles: signal(s) of the own cluster,

Identity check negative but midambles: signal(s) of another cluster,

Result negative, no midambles but some power maybe sporadic interference.

In order to further verify the various received signals, the 'First slot', indicated in the control slot, might be evaluated. This provides a 'pointer' for the corresponding data slots, which positions might be compared with the detected midambles. However, the midamble correlation should yield the more reliable information.

What is claimed is:

1. Communication system using a time division multiple access TDMA data transfer method, wherein data is transferred in frames, with a frame being divided in a number of time slots and a frame consisting of several control time slots at the beginning and subsequent data time slots, wherein a specific control time slot is dedicated to a specific user and wherein to each time slot a first defined guard time is associated, characterized in that, a frame alignment is being made by the steps of:

the timing of a first occupied control time slot of the frame is defined by referring back to the timing of the last occupied control time slot of the previous frame, each subsequent occupied control time slot is time-positioned with regard to the previous occupied control time slot of the same frame, the timing of the occupied data time slots within the frame is defined by referring back to the timing of the last occupied control time slot of the same frame, and wherein a second defined guard time is associated with the frame, this guard time being positioned at the end of the frame, wherein the second defined guard time is extended with regard to the first defined guard time.

2. Communication system according to claim 1, wherein to each signal sent in a time slot a midamble is added which is used for determining a timing reference point for the corresponding time slot.

3. Communication system according to claim 1, wherein to a data time slot a different guard time is associated as to a control time slot, with any multiple of the control time slot guard time being different to the data time slot guard time.

4. Communication system according to claim 2, wherein two training sequences of identical length are transmitted in the midamble of a time slot, in particular two identical sequences of length of 16 symbols.

5. Communication system according to claim 4, wherein the two identical training sequences are directly bound together and are provided at the outer edges with a number of cyclic information symbols and also with a number of "anti-symbols", continuing the cyclic information having an inverted polarity.

6. User station for a communication system according to one of claim 1, having a receiving unit and a transmitting unit, characterized in that, means are provided for evaluating received signals being sent in control time slots and data time slots and for determining timing reference points for the occupied control time slots and data time slots, wherein for transmitting control signals in the first control time slot of a frame timing adjustment means are provided which adjust the timing of the first control time slot by referring back to the timing of the last occupied control time slot of the previous frame, wherein for transmitting control signals in a subsequent control time slot of the frame timing adjustment means are provided which adjust the timing of the subsequent control time slot by referring back to the timing of the previous occupied control time slot of the same frame, and wherein for transmitting data signals in a data time slot of the frame timing adjustment means are provided which adjust the timing of the data time slot by referring back to the timing of the last occupied control time slot of the same frame.

* * * * *